(12) United States Patent
Kiilerich Pratas et al.

(10) Patent No.: US 12,376,169 B2
(45) Date of Patent: Jul. 29, 2025

(54) MULTIPLE SUBSCRIPTION ENTITIES IN A USER DEVICE

(71) Applicant: Nokia Technologies Oy, Espoo (FI)

(72) Inventors: Nuno Manuel Kiilerich Pratas, Gistrup (DK); Srinivasan Selvaganapathy, Bangalore (IN); Faranaz Sabouri-Sichani, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 348 days.

(21) Appl. No.: 18/002,342

(22) PCT Filed: Jun. 21, 2021

(86) PCT No.: PCT/EP2021/066730
§ 371 (c)(1),
(2) Date: Dec. 19, 2022

(87) PCT Pub. No.: WO2021/259818
PCT Pub. Date: Dec. 30, 2021

(65) Prior Publication Data
US 2023/0232477 A1 Jul. 20, 2023

(30) Foreign Application Priority Data
Jun. 22, 2020 (IN) .............................. 202041026173

(51) Int. Cl.
*H04W 76/15* (2018.01)
*H04W 88/06* (2009.01)

(52) U.S. Cl.
CPC ............ *H04W 76/15* (2018.02); *H04W 88/06* (2013.01)

(58) Field of Classification Search
CPC ...... H04W 76/15; H04W 72/23; H04W 48/08
See application file for complete search history.

(56) References Cited

U.S. PATENT DOCUMENTS

| | | | | |
|---|---|---|---|---|
| 7,463,602 | B2 * | 12/2008 | Farnsworth | H04W 48/08 370/282 |
| 11,057,817 | B2 * | 7/2021 | Yilmaz | H04W 72/23 |
| 12,057,916 | B2 * | 8/2024 | Zhang | H04W 76/15 |
| 2018/0160422 | A1 | 6/2018 | Pathak et al. | |
| 2018/0279409 | A1 * | 9/2018 | Balasubramanian | H04W 72/23 |
| 2018/0368101 | A1 | 12/2018 | Agiwal et al. | |
| 2020/0359441 | A1 * | 11/2020 | Yilmaz | H04L 5/0098 |

(Continued)

FOREIGN PATENT DOCUMENTS

| | | |
|---|---|---|
| CN | 105744545 A | 7/2016 |
| CN | 110741721 A | 1/2020 |

(Continued)

OTHER PUBLICATIONS

English translation of WO 2014/201689 Feb. 2025 (Year: 2025).*

(Continued)

*Primary Examiner* — William D Cumming
(74) *Attorney, Agent, or Firm* — Nokia Technologies Oy

(57) ABSTRACT

To facilitate multiple subscription entities in a user device, solutions enabling use of an established wireless signaling connection between a network and a subscription entity to establish further wireless signaling connection(s) between the network and one or more other subscription entities are disclosed.

12 Claims, 5 Drawing Sheets

(56) References Cited

U.S. PATENT DOCUMENTS

| | | | |
|---|---|---|---|
| 2022/0140881 A1* | 5/2022 | Zhang | H04L 5/0051 370/329 |
| 2023/0232477 A1* | 7/2023 | Kiilerich Pratas | H04W 60/005 370/310 |
| 2024/0214109 A1* | 6/2024 | Zhang | H04L 1/0004 |

FOREIGN PATENT DOCUMENTS

| | | | | |
|---|---|---|---|---|
| CN | 115989717 A | * | 4/2023 | ............ H04W 48/18 |
| WO | WO-2014201689 A1 | * | 12/2014 | ............ H04W 8/18 |
| WO | 2020/250548 A1 | | 12/2020 | |
| WO | 2021/088769 A1 | | 5/2021 | |
| WO | WO-2021259818 A1 | * | 12/2021 | ............ H04W 48/18 |

OTHER PUBLICATIONS

"3rd Generation Partnership Project; Technical Specification Group Radio Access Network; NR; Medium Access Control (MAC) protocol specification (Release 15)", 3GPP TS 38.321, V15.8.0, Dec. 2019, pp. 1-78.

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

"Revised SID: Study on system enablers for multi-SIM devices", TSG SA Meeting #SP-83, SP-190248, Agenda: 178.19, SA WG2, Mar. 20-22, 2019, 4 pages.

"3rd Generation Partnership Project; Technical Specification Group Services and System Aspects; Study on Support for Multi-USIM Devices (Release 17)", 3GPP TR 22.834, V17.2.0, Dec. 2019, pp. 1-17.

"3rd Generation Partnership Project; Technical Specification Group Services and System Aspects; Study on system enablers for devices having multiple Universal Subscriber Identity Modules (USIM) (Release 17)", 3GPP TR 23.761, V0.3.0, Jan. 2020, pp. 1-37.

"New WID: Support for Multi-SIM devices in Rel-17", 3GPP TSG RAN Meeting #86, RP-193263, Agenda: 9.1.2, vivo, Dec. 9-12, 2019, 5 pages.

"FS_MUSIM Work Tasks", 3GPP SA TSG Meeting #86, SP-191353, Agenda: N/A, Intel, Dec. 9-13, 2019, pp. 1-2.

International Search Report and Written Opinion received for corresponding Patent Cooperation Treaty Application No. PCT/EP2021/066730, dated Sep. 23, 2021, 15 pages.

"Efficient RRC state transitions from RRC_CONNECTED to RRC Idle or to RRC Inactive", 3GPP TSG RAN WG2 Meeting #105bis, R2-1904433, Agenda: 11.11.3, Intel Corporation, Apr. 8-12, 2019, 3 pages.

"Informing network two USIMs belongs to same device", SA WG2 Meeting #136AH, S2-2000699, Agenda: 8.4, Samsung, Jan. 13-17, 2020, 3 pages.

"Musim UE and Same PLMN discussion", S2-1911891, Samsung, Nov. 8, 2019, 7 pages.

"On eMBB Upper Layer Enhancements", 3GPP TSG RAN Rel-18 workshop, RWS-210004, Agenda: 4.2, Qualcomm, Jun. 28-Jul. 2, 2021, pp. 1-13.

Office action received for corresponding Chinese Patent Application No. 202180051677.6, dated Nov. 25, 2024, 6 pages of office action and 5 pages of translation available.

Office action received for corresponding European Patent Application No. 21735239.2, dated Feb. 17, 2025, 5 pages.

Office action received for corresponding Chinese Patent Application No. 202180051677.6, dated May 12, 2025, 6 pages of office action and 10 pages of summary & translation available.

Li, "Dual SIM design technology of LTE multi-mode terminals", Jingjilei, Dec. 31, 2016, 1 page.

\* cited by examiner

MULTIPLE SUBSCRIPTION ENTITIES IN A USER DEVICE

RELATED APPLICATION

This application was originally filed as PCT Application No. PCT/EP2021/066730 on Jun. 21, 2021, which claims priority to IN Provisional Application No. 202041026173, filed on Jun. 22, 2020, each of which is incorporated herein by reference in its entirety.

TECHNICAL FIELD

Various example embodiments relate to wireless communications, and especially to multiple subscription entities in a user device.

BACKGROUND

Wireless communication systems are under constant development. However, some features have been available some time. One example is to have multiple subscriber identity modules, or corresponding subscription entities in one user device. User devices supporting use of multiple subscription entities utilize device proprietary implementations.

BRIEF DESCRIPTION

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

An aspect provides a user device comprising at least one processor; and at least one memory including computer program code, the at least one memory and computer program code configured to, with the at least one processor, cause the user device at least to perform: having at least two different subscription entities; causing establishing a first wireless signaling connection to a network for a first subscription entity when it transits from an idle state to a connected state; sending, by the first subscription entity, at least to a second subscription entity among the at least two different subscription entities in the user device information that the first wireless signaling connection exists; sending, by the second subscription entity in an idle state, in response to the information, to the first subscription entity an indication that the second subscription entity wants to establish a wireless signaling connection to transit from an idle state to a connected state; causing sending, in response to the first subscription entity receiving from the second subscription entity the indication, using the first wireless signaling connection, a request for establishing a second signaling connection for the second subscription entity; receiving, by the first subscription entity, from the network, information required for the second wireless signaling connection; passing the information required for the second wireless signaling connection from the first subscription entity to the second subscription entity; and causing establishing, using the information required for the second wireless signaling connection, the second wireless signaling connection for the second subscription.

In an embodiment, the at least one memory and computer program code configured to, with the at least one processor, cause the user device further to perform using a random access procedure when establishing the first wireless signaling connection.

In an embodiment, the at least one memory and computer program code configured to, with the at least one processor, cause the user device further to perform: causing sending a request for a signaling radio bearer as the request for establishing the second signaling connection for the second subscription entity in a medium access control, MAC, level control element or in a buffer status report to an access node in the cell, the access node providing a first radio link between the access node and the first subscription entity, the first radio link being part of the first wireless signaling connection; receiving, as the information required for the second signaling connection, a radio network temporary identifier in a MAC level control element; wherein the causing establishing the second wireless signaling connection for the second subscription comprises: monitoring, by the second subscription entity, downlink MAC level control elements to detect a control element comprising the radio network temporary identifier, the control element providing an uplink grant for the second subscription entity in resources of the first wireless signaling connection; sending, in response to detecting the control element, a radio resource control, RRC, connection set up request from the second subscription entity using the resources indicated in the uplink grant; establishing an RRC connection between the access node and the second subscription entity, the RRC connection being a second radio link that is part of the second wireless signaling connection; and establishing a mobility control, MC, connection between the second subscription entity and a node in a core network of the network, the MC connection being the second wireless signaling connection comprising the second radio link.

In an embodiment, the at least one memory and computer program code configured to, with the at least one processor, cause the user device further to perform: sending, by the second subscription entity, as the indication, a radio resource control, RRC, connection request; causing sending, over the first wireless connection, to an access node in a cell, the access node providing a first radio link between the access node and the first subscription entity, the first radio link being part of the first wireless signaling connection, an RRC message requesting an uplink resource for a signaling radio bearer, SRB; encapsulating, in response to receiving indication of the uplink resource, by the first subscription entity, the RRC connection request within an SRB message; causing sending in the uplink resource the request for establishing the second signaling connection for the second subscription entity encapsulated in the SRB message to the access node; receiving, as the information required for the second signaling connection, a radio network temporary identifier; wherein the causing establishing the second wireless signaling connection for the second subscription comprises: monitoring, by the second subscription entity, downlink control signaling to detect a message comprising the radio network temporary identifier and indicating resources allocated for the second subscription entity in a second radio link that is part of the second wireless signaling connection; causing sending, in response to detecting the message, an RRC setup completed message to the access node using the resources in the second radio link; and establishing a mobility control, MC, connection between the second subscription entity and a node in a core network of the network, the MC connection being the second wireless signaling connection comprising the second radio link.

In an embodiment, the at least one memory and computer program code configured to, with the at least one processor, cause the user device further to perform, when the first subscription is in the connected state and the second subscription has transit from the connected state to an inactive state: sending, by the second subscription entity in the inactive state to the first subscription entity as the indication a resumption indication that the second subscription entity wants to resume the second wireless signaling connection to transit from an inactive state to a connected state; and causing sending, in response to the first subscription entity receiving from the second subscription entity the resumption indication, using the first wireless signaling connection, a resume request as the request for the second signaling connection for the second subscription entity.

In an embodiment, the at least one memory and computer program code configured to, with the at least one processor, cause the user device further to perform: determining, whether the network supports a use of the first wireless connection to request establishment of the second wireless connection, based on information received in broadcast from the network; and performing the sending, by the first subscription entity, the information that the first wireless signaling connection exists, in response to the network supporting the use.

In an embodiment, the at least one memory and computer program code configured to, with the at least one processor, cause the user device further to perform: causing sending to the network an inquiry, whether the network supports a use of the first wireless connection to request establishment of the second wireless connection; and performing the sending the information that the first wireless signaling connection exists in response to a response to the inquiry indicating that the network supports the use.

In an embodiment, the subscription entities are universal subscriber identity modules.

An aspect provides an apparatus comprising at least one processor; and at least one memory including computer program code, the at least one memory and computer program code configured to, with the at least one processor, cause the apparatus at least to perform: receiving, over a first wireless signaling connection to a first subscription entity in a user device, information indicating a request for establishing a second signaling connection to a second subscription entity in the user device; generating network information required for the second wireless signaling connection; sending the network information over the first wireless signaling connection to the first subscription entity; sending downlink information comprising the network information; and establishing the second wireless signaling connection with the second subscription entity.

In an embodiment, wherein the first wireless signaling connection is a radio resource control, RRC, connection and the at least one memory and computer program code configured to, with the at least one processor, cause the apparatus further to perform: receiving the information in a medium access control, MAC, level control element or in a buffer status report; sending, as the network information, in a MAC level control element, a temporary identifier to the second wireless connection, wherein the establishing comprises: receiving an RRC connection request from the second subscription entity; accepting the RRC connection request; and establishing a second RRC connection as the second wireless signaling connection.

In an embodiment, wherein the first wireless signaling connection is a radio resource control, RRC, connection and the at least one memory and computer program code configured to, with the at least one processor, cause the apparatus further to perform: receiving the information as an RRC connection request encapsulated within a signaling radio bearer, SRB, message; sending, as the network information, a temporary identifier to the second wireless connection; and sending, as the downlink information, an RRC connection setup message comprising the radio network temporary identifier, wherein the second wireless signaling connection is a second RRC connection.

In an embodiment, the at least one memory and computer program code configured to, with the at least one processor, cause the apparatus further to perform broadcasting information, whether the apparatus supports a use of the first wireless connection to request establishment of the second wireless connection.

In an embodiment, the at least one memory and computer program code configured to, with the at least one processor, cause the apparatus further to perform causing sending, in response to receiving from the user device an inquiry, whether the network supports a use of the first wireless connection to request establishment of the second wireless connection, a response indicating support for the use.

An aspect provides a method for a user device having at least two different subscription entities, the method comprising: causing establishing a first wireless signaling connection to a network for a first subscription entity when it transits from an idle state to a connected state; sending, by the first subscription entity, at least to a second subscription entity among the at least two different subscription entities in the user device information that the first wireless signaling connection exists; sending, by the second subscription entity in an idle state, in response to the information, to the first subscription entity an indication that the second subscription entity wants to establish a wireless signaling connection to transit from an idle state to a connected state; causing sending, in response to the first subscription entity receiving from the second subscription entity the indication, using the first wireless signaling connection, a request for establishing a second signaling connection for the second subscription entity; receiving, by the first subscription entity, from the network, information required for the second wireless signaling connection; passing the information required for the second wireless signaling connection from the first subscription entity to the second subscription entity; and causing establishing, using the information required for the second wireless signaling connection, the second wireless signaling connection for the second subscription.

An aspect provides a method for an access node, the method comprising: receiving, over a first wireless signaling connection to a first subscription entity in a user device, information indicating a request for establishing a second signaling connection to a second subscription entity in the user device; generating network information required for the second wireless signaling connection; sending the network information over the first wireless signaling connection to the first subscription entity; sending downlink information comprising the network information; and establishing the second wireless signaling connection with the second subscription entity.

An aspect may provide a computer program comprising instructions which, when the program is executed by one or more processors, cause the one or more processors to carry out at least: causing establishing a first wireless signaling connection to a network for a first subscription entity when it transits from an idle state to a connected state; causing sending, by the first subscription entity, at least to a second subscription entity among the at least two different subscription entities in the user device information that the first wireless signaling connection exists; causing sending, by the second subscription entity in an idle state, in response to the information, to the first subscription entity an indication that the second subscription entity wants to establish a wireless signaling connection to transit from an idle state to a connected state; causing sending, in response to the first subscription entity receiving from the second subscription entity the indication, using the first wireless signaling connection, a request for establishing a second signaling connection for the second subscription entity; passing, in response to the first subscription entity receiving from the network information required for the second wireless signaling connection, the information required for the second wireless signaling connection from the first subscription entity to the second subscription entity; and causing establishing, using the information required for the second wireless signaling connection, the second wireless signaling connection for the second subscription.

An aspect may provide a computer program comprising instructions which, when the program is executed by one or more processors, cause the one or more processors to carry out at least: generating, in response to receiving over a first wireless signaling connection to a first subscription entity in a user device information indicating a request for establishing a second signaling connection to a second subscription entity in the user device, network information required for the second wireless signaling connection; causing sending the network information over the first wireless signaling connection to the first subscription entity; causing sending downlink information comprising the network information; and causing establishing the second wireless signaling connection with the second subscription entity.

An aspect may provide a non-transitory computer-readable storage medium storing one or more instructions which, when executed by one or more processors, cause the one or more processors to carry out at least: causing establishing a first wireless signaling connection to a network for a first subscription entity when it transits from an idle state to a connected state; causing sending, by the first subscription entity, at least to a second subscription entity among the at least two different subscription entities in the user device information that the first wireless signaling connection exists; causing sending, by the second subscription entity in an idle state, in response to the information, to the first subscription entity an indication that the second subscription entity wants to establish a wireless signaling connection to transit from an idle state to a connected state; causing sending, in response to the first subscription entity receiving from the second subscription entity the indication, using the first wireless signaling connection, a request for establishing a second signaling connection for the second subscription entity; passing, in response to the first subscription entity receiving from the network information required for the second wireless signaling connection, the information required for the second wireless signaling connection from the first subscription entity to the second subscription entity; and causing establishing, using the information required for the second wireless signaling connection, the second wireless signaling connection for the second subscription.

An aspect may provide a non-transitory computer-readable storage medium storing one or more instructions which, when executed by one or more processors, cause the one or more processors to carry out at least: generating, in response to receiving over a first wireless signaling connection to a first subscription entity in a user device information indicating a request for establishing a second signaling connection to a second subscription entity in the user device, network information required for the second wireless signaling connection; causing sending the network information over the first wireless signaling connection to the first subscription entity; causing sending downlink information comprising the network information; and causing establishing the second wireless signaling connection with the second subscription entity.

BRIEF DESCRIPTION OF DRAWINGS

Embodiments are described below, by way of example only, with reference to the accompanying drawings, in which

FIGS. 3 to 5 are flow charts illustrating different examples of functionalities of a user device;

DETAILED DESCRIPTION OF SOME EMBODIMENTS

The following embodiments are examples. Although the specification may re-fer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also fea-tures/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first element could be termed a second element, and similarly, a second element could be also termed a first element without departing from the scope of the present disclosure.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecom-munications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
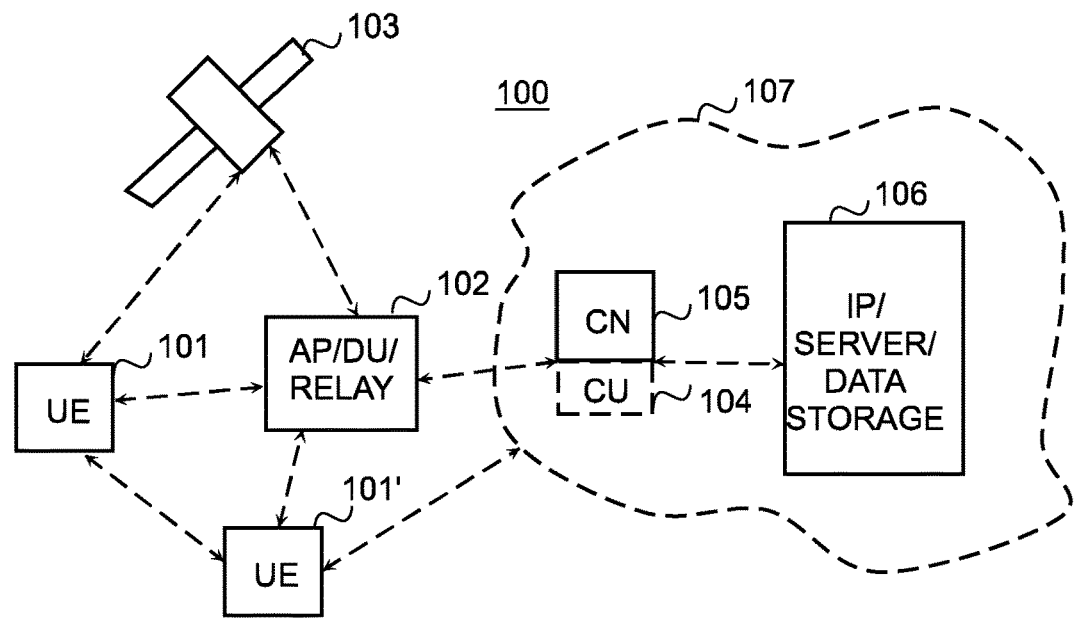
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), access and mobility management function (AMF), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus.

The user device typically refers to a portable computing device that includes wireless mobile communication devices operating with a subscription entity, for example a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, wearable device, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of inter-connected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different require-ments on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (I) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more integrated access and backhaul (IAB) nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addi-tion to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
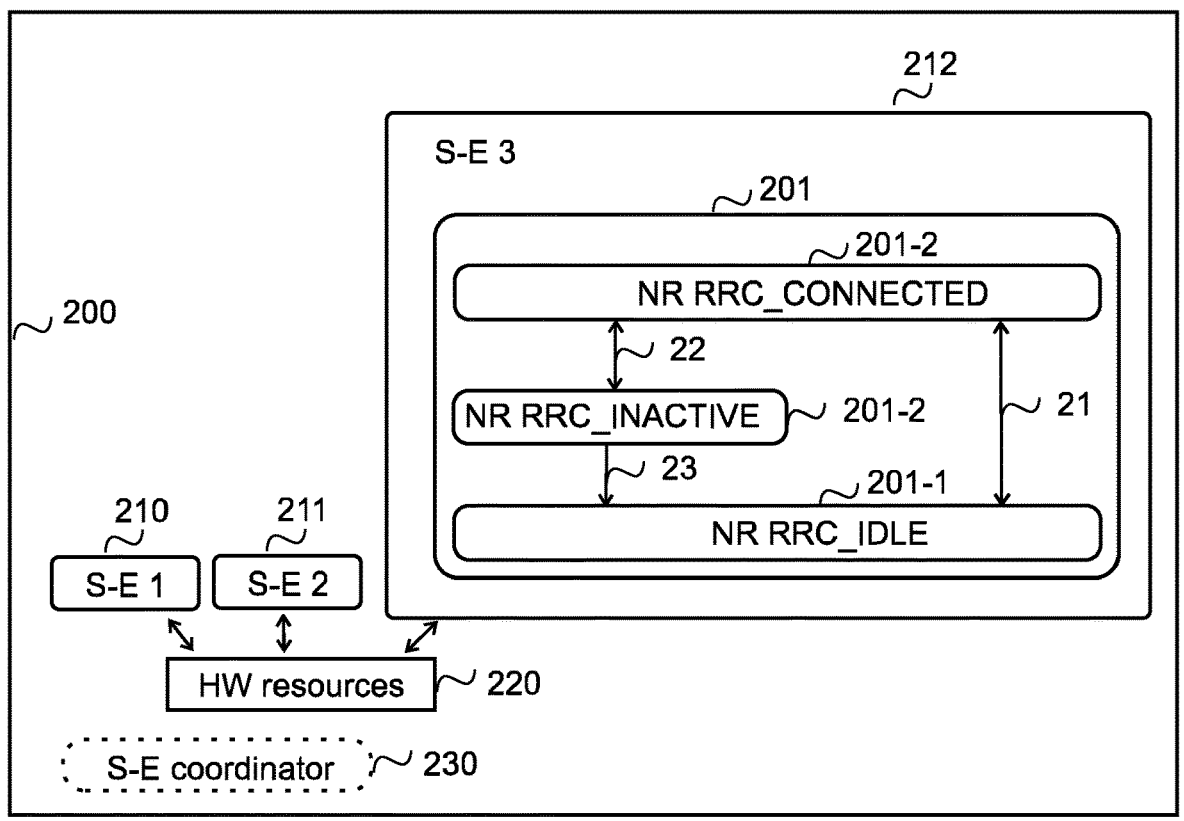
FIG. 2 is a schematic block diagram.

FIG. 2 illustrates a simplified example of a user device, which is configured to support multiple subscription entities for multiple network subscriptions and interaction between the subscription entities. It should be appreciated that FIG. 2 only shows some entities/units to illustrate the user device. It is apparent to a person skilled in the art that the user device also comprises functional entities and hardware, and any number of illustrated entities/units.

Referring to FIG. 2, the user device 200 comprises subscription entities (S-E 1, S-E 2, S-E 3) 210, 211, 212 sharing hardware (HW) resources 220 of the user device 200, the sharing being coordinated, in the illustrated example, by a subscription coordinator entity 230.

A subscription entity 210, 211, 212 may be an integrated circuit/smart card removably inserted into the user device 200, or a programmable subscription entity embedded directly to the user device 200. Regardless of its implementation, the subscription entity 210, 211, 212 comprises subscription-related information stored in the subscription entity, which is a security environment in the user device. The subscription-related information includes a subscriber identity and one or more associated security keys. The subscriber identity is a permanent identifier that is assigned by a mobile network operator/service provider and is valid while the service is available for the operator/service provider. The subscriber identity may be an international mobile subscriber identity (IMSI), or a subscription permanent identifier (SUPI). The multiple subscription entities 210, 211, 212 may be for the same or different mobile network operator, or mobile virtual network operator, that are processed, due to independent subscriptions, in the network side as different user devices. The subscription entity 210, 211, 212 may be called a universal subscriber identity module (USIM).

A subscription entity transits between different states. For example, in the new radio, in which control signaling is called control plane signaling, following states are envisaged for control plane signaling connections:

Idle state, in which both a control plane signaling connection to an access node in a radio access network and a control plane signaling connection to a network node in a core network have not been established or have been released from previous session (in either Connected or Inactive state);

Connected state, in which both the control plane signaling connection to the access node in the radio access network and the control plane signaling connection to the network node in the core network have been established and are currently active; and/or Inactive state, in which the control plane signaling connection to the access node in the radio access network is in an inactive state (suspended) but the control plane signaling connection to the network node in the core network is in the connected state. The inactive state may be called also a mixed state.

In the new radio (NR), the state of the control plane signaling connection to the access node is managed by a radio resource control, RCC, and the state of the control plane signaling connection to the network node in the core network is managed by a connection management, CM. In the example of FIG. 2, an RRC state machine 201 is depicted in one (S-E 3) 212 of the subscription entities. It should be appreciated that all subscription entities comprise corresponding state machines. The state transitions, starting from the idle state, may be as follows: from NR RRC_IDLE 201-1 to NR RRC_CONNECTED 201-2, then from CM_IDLE to CM_CONNECTED, the state transitions including establishment (establish 21) of the control plane connections, wherein the control plane signaling to the network node in the core network comprises, as a first part, the control plane signaling connection to the access node, and as a remaining part, a control plane signaling connection from the access node to the network node. The RRC state from NR RRC_CONNECTED 201-2 may transit to NR RRC_INACTIVE 201-3 by suspending (release with suspend 22) the control plane signaling connection between the subscription entity and the access node while maintaining CM_CONNECTED state. The RRC state may transit from the NR RRC_INACTIVE 201-3 back to NR RRC_CONNECTED 201-2 by resuming (resume 22) the control plane signaling connection between the subscription entity and the access node. The RRC state NR RRC_INACTIVE 201-3 may transit back (release 23) to NR RRC_IDLE 201-1 and the RRC state NR RRC_CONNECTED 202-2 may transit back (release 21) to NR RRC_IDLE 201-1, both transitions causing CM state transition from CM_CONNECTED to CM_IDLE, the transitions including releasing the control plane signaling connections. Below the RRC states are used without acronym NR.

The hardware resources 220 may comprise a single transmission hardware, reception hardware, user interface, etc., shared by the subscription entities, or it may comprise at least some hardware resources 220 that are subscription entity-specific. For example, assuming that the user device has two subscription entities, the following sce-narios are possible for reception and transmission:

Hardware resources comprises a single receiver and a single transmitter, wherein the user device is capable of receiving and/or transmitting traffic for one subscription entity at a time (type 1);

Hardware resources comprises two receivers and a single transmitter, wherein the user device is capable of simultaneously receiving traffic for both subscription entities but transmitting traffic for one subscription entity at a time (type 2); or Hardware resources comprises two receivers and two transmitters, wherein the user device is capable of simultaneously receiving and/or transmitting traffic for both subscription entities (type 3).

A combination of a subscription entity in the user device and the hardware resources in the user device may perform one or more functions, such as monitoring paging, cell reselection, tracking area update, and the like, and may independently of the other corresponding combinations in the user device transmit or receive user data to or from the network. However, at least in type 1 and type 2 implementations some coordination between subscription entities regarding the use of the shared hardware may be needed. Further, also in type 3 implementation some coordination of tasks may be performed. For example, tasks like radio link monitoring, cell measurements and timing advance maintenance, may be disabled in all the subscription entities other than one of the currently active subscription entity. For that purpose, the user device may comprise a specific subscription entity coordinator entity 230. Other ways to implement coordination between subscription entities, if needed, can be used.

It should be appreciated that any internal information exchange mechanism may be used between the different entities and between the entities and the hardware resources in the user device.

Figure 3:
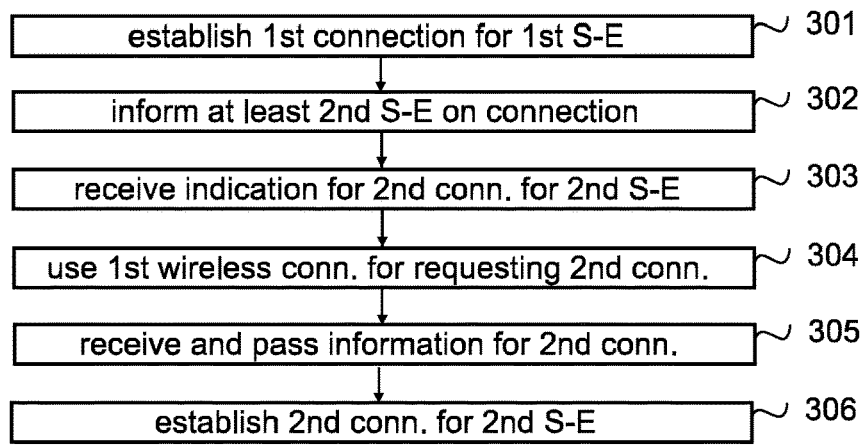
FIG. 3 illustrates an example of messaging configuration information.

FIG. 3 is a flow chart illustrating an example functionality of a user device having multiple subscription entities, denoted by S-E in Figures, each in idle state or in inactive state when the functionality begins. Further, for the convenience of explanation, in the illustrated example, it is assumed that requests for signaling connections, i.e. requests for control signaling connections, are not rejected.

Referring to FIG. 3, the first one of the subscription entities transits its state from the idle to connected. Therefore, a first wireless signaling connection to a network for the first subscription entity is established in block 301. The establishment includes procedures required for establishment of the signaling connection, like cell search/selection, initial access and random access procedure, or corresponding procedures, if used and named differently, in future network technologies. When the first subscription entity is in the connected state, it informs in block 302 at least one of the multiple subscription entities that the first wireless signaling connection exists. In other words, the first subscription entity sends in block 302 at least to a second subscription entity in the user device information that the first wireless signaling connection exists.

The second subscription entity, when it transits its state from the idle to connected, sends, because of the information that the first wireless signaling connection exists, to the first subscription entity an indication that it requests establishment of a signaling connection to the network. The indication contains some identification information of the second subscription entity, for example a temporary subscriber identifier. When the first subscription entity receives (block 303) the indication for a second signaling connection to the network for the second subscription entity, it causes the user device to send (block 304), using the first signaling connection, a request for establishing a second signaling connection for the second subscription entity.

In the illustrated example it is assumed that the request is accepted, and the first subscription entity receives in block 305 from the network information required for the second signaling connection. For example, the information received may comprise an identifier for the second signaling connection. The identifier may be a cell radio network temporary identifier (C-RNTI) used to differentiate connected user devices in a cell, i.e. to identify a connected user device in the cell. Since the combinations of the subscription entities in a connected state in the user device and the hardware resources in the user device are treated as different user devices in the network side, the identifier is different from the identifier used for the first signaling connection. The first subscription entity passes in block 305 the received information required for the second signaling connection to the second subscription entity. The information is used in block 306 to establish the second wireless signaling connection to the network for the second subscription.

If the user device contains more than two subscription entities, the process described with blocks 303 to 306 may be performed for the other subscription entities as well, or the process may be chained so that the second subscription entity informs a third subscription entity, and the second wireless signaling connection is used in block 304, etc.

Figure 4:
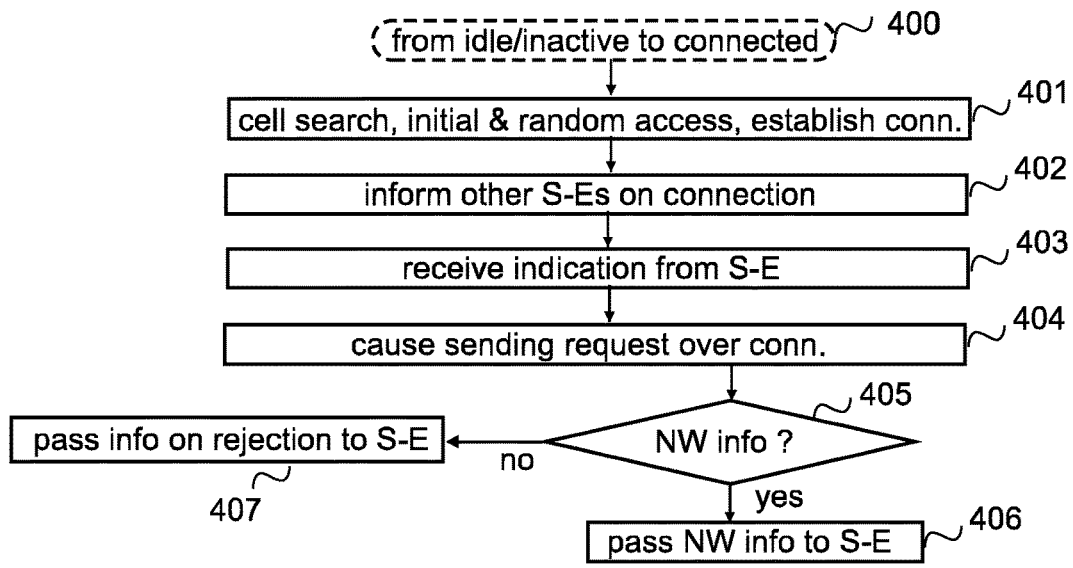

FIG. 4 is a flow chart illustrating an example functionality of a subscription entity module using hardware resources in a user device. In the illustrated example it is assumed that the network node does not send any information, whether the network supports use of an existing signaling connection for establishing a further signaling connection for another subscription entity. Further, it is assumed that all subscription entities are in the idle state or in the inactive state, when the process described in FIG. 4 starts. If one of the subscription entities is a master, which may be configured to coordinate use of the hardware resources, for example, and which always is the first one changing the state from the idle state/inactive state to connected state, the process described in FIG. 4 describes the process of the master subscription entity.

Referring to FIG. 4, when a transition from the idle state/inactive state to connected state is triggered (block 400), a full establishment of wireless control signaling connections is performed in block 401. The full establishment includes cell search/selection, initial access and random access procedure and establishment of the wireless control signaling connection(s). After establishment of the wireless control signaling connection(s) for the subscription entity, the other subscription entities in the user device are informed in block 402 internally on the existence of the wireless control signaling connection(s).

Then an indication is received in block 403 from another subscription entity that it requests establishment of a signaling connection to the network. The indication contains some identification information of the other subscription entity, for example a temporary subscriber identifier, as discussed above with block 303. Therefore, the user device is caused to send in block 404, using the wireless signaling connection established in block 401, a request for establishing another wireless signaling connection for the other subscription entity.

If the response to the request contains network information (NW info) required for the other signaling connection (block 405: yes), as discussed above with block 305, the network information is passed in block 406 to the subscription entity wherefrom the indication in block 404 was received.

If the response does not contain the network information (block 405: no), i.e. the response is an explicit rejection or a response interpreted to be a rejection, or no response is received, which is also interpreted to be a rejection, information on the rejection is passed in block 407 to the subscription entity wherefrom the indication in block 404 was received. Reasons for no response/rejection include that the network, or the access node is not configured to support the use of an existing signaling connection for establishing a further signaling connection for another subscription entity, or there is a peak and all resources are already in use. It should be appreciated that there may be also other reasons, the listed ones are just examples.

Figure 5:
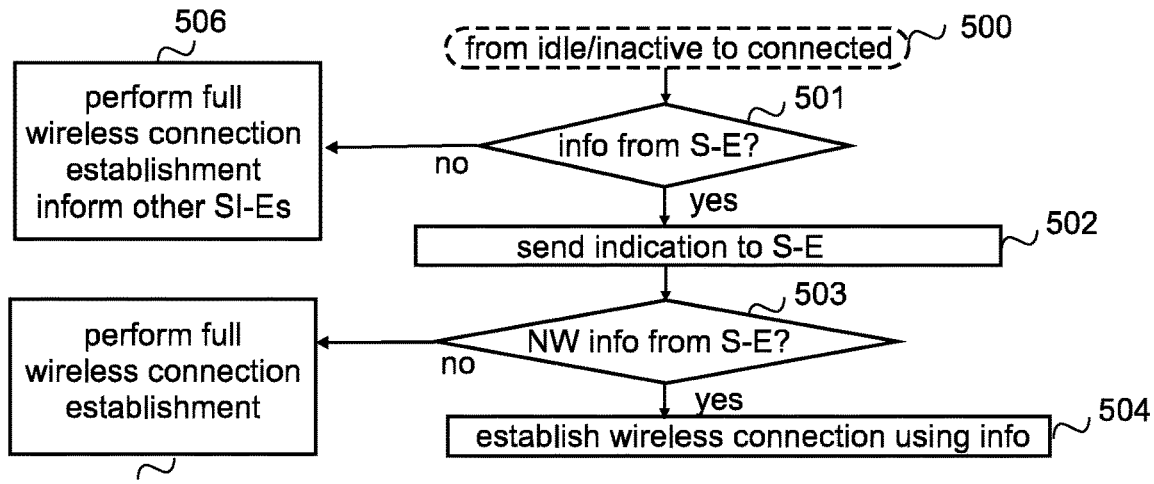

FIG. 5 is a flow chart illustrating an example functionality of a subscription entity module using hardware resources in a user device. In the example of FIG. 5, it is also assumed that the network node does not send any information, whether the network supports use of an existing signaling connection for establishing a further signaling connection for another subscription entity.

Referring to FIG. 5, when a transition from the idle state to connected state is triggered (block 500), it is checked in block 501, whether an internal information on an existence of a wireless control signaling connection has been received from another subscription entity. If it has been (block 501: yes), an indication is sent in block 502 internally to the other subscription entity, the indication indicating that an establishment of a signaling connection to the network is requested. The indication contains some identification information of the subscription entity, for example a temporary subscriber identifier, as discussed above with block 303.

Then a response to the indication is received from the other subscription entity. If the response contains network information (NW info) required for the signaling connection (block 503: yes), the wireless signaling connection is established in block 504 using the received information. For example, the subscription entity may monitor downlink channel, detect information relating to a temporary identifier received in the network information, and establish the wireless signaling connection to the network.

If the response does not contain the network information (block 503: no), it is a rejection, or at least treated in the illustrated example as a rejection as described above with block 405 in FIG. 4, a full establishment of wireless control signaling connections is performed in block 505, the full establishment being described above with block 401.

If no internal information on an existence of a wireless control signaling connection has been received from another subscription entity (block 501: no), the subscriber entity is the first one performing the transition from the idle state to the connected state. Therefore, a full establishment of wireless control signaling connections is performed in block 506, and other subscription entities in the user device are informed in block 506 internally on the existence of the wireless control signaling connection(s). Then the process may continue as described above in blocks 403 to 407. However, that is not illustrated in FIG. 5.

Figure 6:
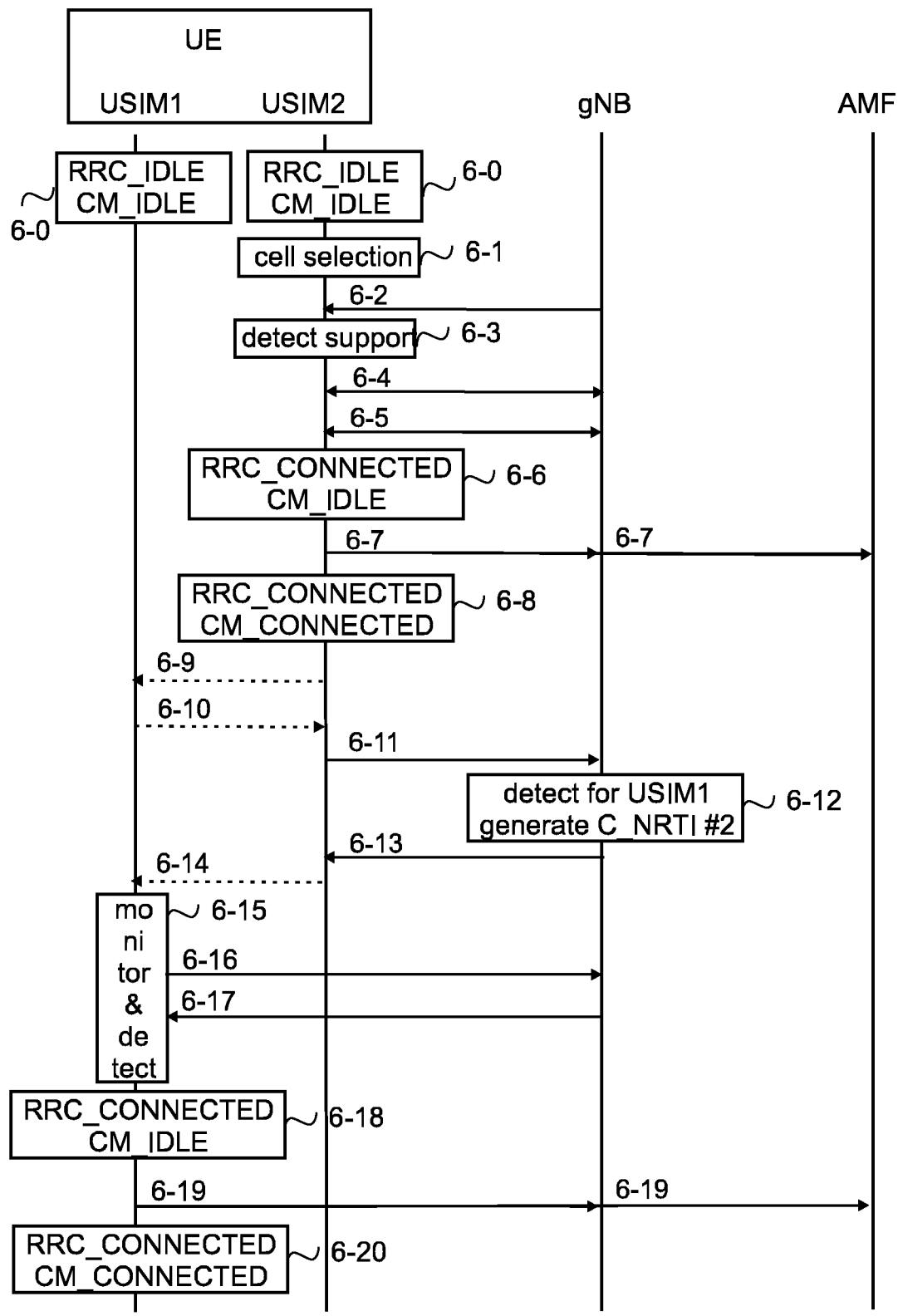
FIGS. 6, 7 and 8 illustrate examples of information exchange.
Figure 7:
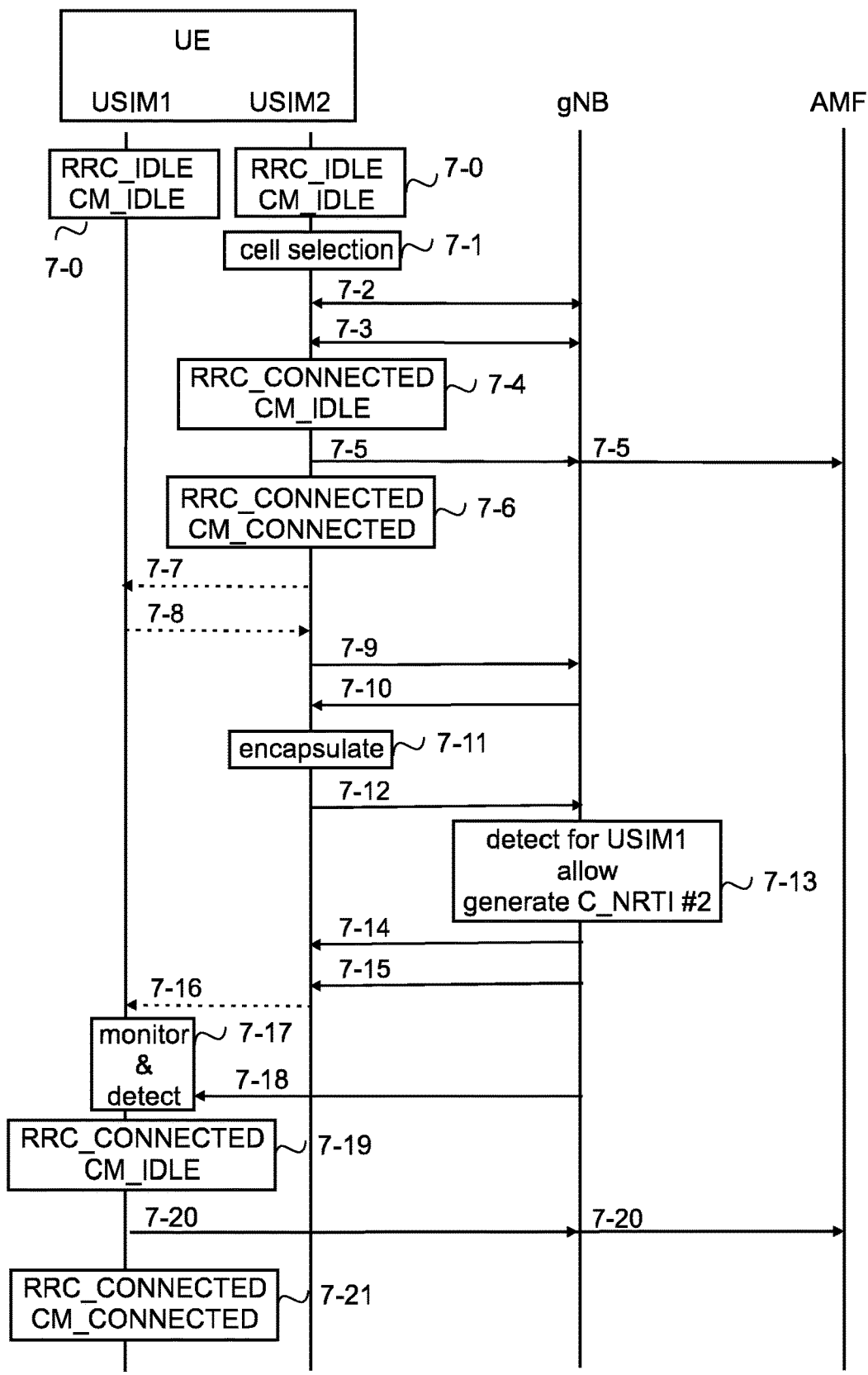

FIGS. 6 and 7 illustrate examples of messaging control information according to an example, wherein the user device UE comprises two subscription entities, named USIM1 and USIM2, the protocols used are for NR, an access node in a wireless access network, which is radio access, is called gNB, and a network node in the core network is an access and mobility management function node called AMF, without restricting the examples to such a solution. It should be appreciated that the described principles may be implemented to similar concepts that are using different naming. The example in FIG. 6 is using a MAC (medium access control) level solution and the example in FIG. 7 is used an RRC (radio resource control level) solution. The MAC level solution utilizes entities in MAC layer, which is a sublayer of layer 2 in the protocol stack of the new radio. RRC level solution utilizes entities in RRC layer, which is layer 3 in the protocol stack of the new radio. Further, in the example of FIG. 6, the network is configured to inform, by broadcasting, that it supports the use of an existing signaling connection for establishing a further signaling connection for another subscription entity, whereas in the example of FIG. 7 no such information is sent to user devices, and the support may be defined case by case (i.e. request by request). It should be appreciated that the MAC level solution may be used with a network not broadcasting the support information and the RRC level solution may be used with a network broadcasting the support information. Further, both solutions may be used, instead of broadcasting or with no information on support, with information exchange described with FIG. 8.

Referring to FIG. 6, both subscription entities USIM1 and USIM2 are in block 6-0 in the idle state, i.e. the states are RRC_IDLE and CM_IDLE. The UE performs cell search and selection in block 6-1. In broadcast (message 6-2) of the selected cell gNB sends information on the network, and in the illustrated example broadcast contains SIB1 (system information block 1) informing that the network supports the use of an existing signaling connection for establishing a further signaling connection for another subscription entity. USIM 2 detects (block 6-3) the support. Then USIM2 performs a full initial access procedure, which starts by the random access procedure, also called an RACH (random access channel) procedure, in order to initiate the RRC connection establishment. Then rest of the full initial access is performed using messages 6-4, and a radio link (wireless signaling connection) establishment with a first signaling radio bearer is performed using messages 6-5. Messages 6-4 comprise PRACH and Random Access Response messages. Messages 6-5 comprise RRC Setup Request, Contention Resolution, and RRC Setup. After exchanging messages 6-4, 6-5, and performing related functionalities USIM2 the states of USIM2 are RRC_CONNECTED and CM_IDLE (block 6-6). Then USIM2 performs CM connection establishment (wireless signaling connection) by message 6-7 via gNB, using the existing radio link. Messages 6-7 may comprise USIM2 sending to gNB RRC Setup Complete message which triggers gNB sending Initial UE message to AMF. After messages 6-7, and performing related functionalities USIM2 is in the connected state (block 6-8) in which the states are RRC_CONNECTED and CM_CONNECTED. (After that the context setup signaling takes place but that is not illustrated in FIG. 6.)

Since the support was detected (block 6-3) in the broadcast, USIM2 informs (internal information exchange 6-9) USIM1 that a radio link exists to be used for establishing another radio link (another wireless control signaling connection). Therefore, instead of triggering the cell selection (block 6-1) and the random access procedure (messages 6-4) part of the full initial access procedure, USIM1 sends (internal information exchange 6-10) to USIM2 the indication to establish a second radio link, or a second radio bearer. It should be appreciated that while in FIG. 6 this internal information exchange 6-9, 6-10 is shown to take place after block 6-8, it may take place earlier, i.e. after RRC Connected state of USIM2 while CM establishment is going on.

In response to receiving the indication 6-10, USIM2 sends in its uplink message 6-11, for example in a buffer status report BSR, or in another MAC control element (CE), a request to establish the second signaling radio bearer. The request in message 6-11 contains an indication that the request is for an SRB (signaling radio bearer), which in turn indicates that USIM1 wants to exchange RRC level messages with the network. The request may also contain an indication, for example a flag or a specific field, that the requested SRB is to aid an establishment of a wireless signaling connection of another USIM than the one requesting SRB. (i.e. USIM2 indicates that it requests SRB for USIM1, which will later use SRB to establish a second radio link).

gNB detects in block 6-12 that message 6-11 from USIM2 contains a request to establish a signaling radio bearer for USIM1, and therefore provisions in block 6-12 physical and logical channels for USIM1 to communicate with the network, the provisioning including generating for USIM1 a specific temporary identifier, C_RNTI #2, to be used for communication. (For USIM2 a specific temporary identifier C_RNTI #1 has been generated when the first radio link was established.) Then gNB sends in message 6-13 in a MAC CE to USIM2 a response to the request, the response containing C_RNTI #2 as the network information USIM2 detects the response and passes it (internal information exchange 6-14) to USIM1, which then starts to monitor (block 6-15) downlink control signaling transmissions (not shown in FIG. 6) from gNB to detect C-RNTI #2 for uplink or downlink grants.

When an uplink resource grant associated with USIM1 is detected (block 6-15) (i.e. there is an uplink resource allocation associated with the C-RNTI #2 in the downlink control signaling transmissions, not shown in FIG. 6), USIM1 sends over the first radio link, using the second signaling bearer, message 6-16, which is RRC Setup Request. USIM1 continues to monitor (block 6-15) the downlink control signaling transmissions for a downlink grant associated with the C-RNTI #2, which when received (and detected) will indicate which resources gNB will use to communicate messages 6-17, which is RRC Setup. Basically, messages 6-16 and 6-17 corresponds to messages 6-5 with the exception that Contention Resolution message is not transmitted. Contention Resolution message is not required since the connection establishment of USIM1 does not go through the random access procedure, i.e. block 6-3 is not performed and messages 6-5 are not exchanged. After message 6-17 the states of USIM1 are RRC_CONNECTED and CM_IDLE. (USIM2 has remained in the connected state all the time.)

Then USIM1 performs CM connection establishment (wireless signaling connection) by monitoring downlink control signaling transmissions for a subsequent uplink grant associated with the C-RNTI #2, which when received will indicate which resources in the second radio link established with messages 6-16, 6-17 to use for CM connection establishment by messages 6-20, in the same way as described above with messages 6-7. In other words, USIM1 sends RRC Setup Complete (message 6-20). After that, and performing related functionalities USIM1 is in the connected state (block 6-21) in which the states are RRC_CONNECTED and CM_CONNECTED. (USIM2 can remain in the connected state.)

As long as USIM1 and USIM2 are both in the connected state, they share the hardware resources in the user device, and their uplink and downlink communications are separated by the assigned specific temporary identifiers, C-RNTIs #2 and #1. In other words, the user device comprises two independent UE instances (subscription entities) connected to the same cell. A scheduler in gNB treats each of these instances as separate user devices in the connected state (connected mode), while it ensures that the capabilities of the user device containing the instances are taken into account for downlink and uplink traffic. Further, monitoring of the physical downlink control channel needs to be performed specific to the temporary identifiers, i.e. each instance (USIM1, USIM2) performs the monitoring separately. As said earlier, radio link monitoring and timing advance update mechanism may be performed by one of the instances.

Referring to FIG. 7, both subscription entities USIM1 and USIM2 are in block 7-0 in the idle state, i.e. the states are RRC_IDLE and CM_IDLE. Then USIM2 initiates RRC connection establishment by performing cell search, and cell selection in block 7-1 and the full initial access procedure, which starts by the random access procedure. USIM2 performs. Then rest of the full initial access is performed using messages 7-2, and a radio link (wireless signaling connection) establishment with a first signaling radio bearer (SRB) is performed using messages 7-3. Messages 7-2 comprise PRACH and Random Access Response messages, and messages 7-3 comprise RRC Setup Request, Contention Resolution, and RRC Setup. After exchanging messages 7-2, 7-3, and performing related functionalities the states (block 7-4) of USIM2 are RRC_CONNECTED and CM_IDLE. Then USIM2 performs CM connection establishment (wireless signaling connection) by messages 7-5 via gNB, using the existing radio link, as described above with messages 6-7. After exchanging messages 7-5, and performing related functionalities USIM2 is in the connected state (block 7-6) in which the states are RRC_CONNECTED and CM_CONNECTED. (After that context setup signaling takes place but that is not illustrated in FIG. 7.)

USIM2 informs (internal information exchange 7-7) USIM1 that a radio link exists to be used for establishing another radio link (another wireless control signaling connection). The process starting with cell selection in block 7-1 and ending to information exchange 7-7 corresponds to the process described with FIG. 6 starting with cell selection in block 6-3 and ending to information exchange 6-9.

Because of received information 7-7, instead of triggering the random access procedure (block 7-1 and messages 7-2), USIM1 sends (internal information exchange 7-8) to USIM2 the indication to establish a second radio link. In the illustrated example the indication is an RRC Connection Setup Request. Therefore, USIM 2 requests in message 7-9 resources for uplink transmission over the first SRB. When uplink resource grant is received in message 7-10, USIM2 encapsulates in block 7-11 the RRC Connection Setup Request received in 7-8 within an RRC signaling radio bearer (SRB) message and sends an uplink RRC message 7-12 (message 7-12 encapsulating 7-8).

gNB detects in block 7-13 that message 7-12 contains a request to establish a radio link for USIM1, and therefore provisions in block 7-13 physical and logical channels for USIM1 to communicate with the network, the provisioning including generating for USIM1 a specific temporary identifier, C_RNTI #2, to be used for communication. (For USIM2 a specific temporary identifier C_NRI #1 has been generated when the first radio link was established.) Then gNB sends in message 7-14 an acknowledgment RRC message that acknowledges the encapsulated RRC Connection Setup Request, and signals (message 7-15) C_RNTI #2 as the network information. Message 7-15 is a MAC CE containing C_RNTI #2.

USIM2 notices the acknowledgement (message 7-14) and message 7-15 containing C_RNTI #2 as the network information and passes them (internal information exchange 7-16) to USIM1, which then starts to monitor (block 7-17) physical downlink control channel (downlink control signaling) for a downlink grant associated with C-RNTI #2, the downlink grant pointing to resources containing RRC Setup (message 7-18). When detected (block 7-17), a second radio link has been established and USIM1 is (block 7-19) in the inactive state in which the states are RRC_CONNECTED and CM_IDLE. (USIM2 has remained in the connected state all the time.)

Then USIM1 performs CM connection establishment (wireless signaling connection) by monitoring downlink control signaling transmissions for a subsequent uplink grant associated with the C-RNTI #2, which when received will indicate which resources in the second radio link established to use for CM connection establishment by messages 7-20 via gNB, using the existing second radio link, in the same way as described above with messages 7-5. After messages 7-20, and performing related functionalities USIM1 is in the connected state (block 7-21) in which the states are RRC_CONNECTED and CM_CONNECTED. (USIM2 can remain in the connected state.)

As long as USIM1 and USIM2 are both in the connected state, they share the hardware resources in the user device, and their uplink and downlink communications are separated by the assigned specific temporary identifiers, C-RNTIs #2 and #1. In other words, the user device comprises two independent UE instances (subscription entities) connected to the same cell. A scheduler in gNB treats each of these instances as separate user devices in the connected state (connected mode), while it ensures that the capabilities of the user device containing the instances are taken into account for downlink and uplink traffic. Further, monitoring of the physical downlink control channel needs to be performed per temporary identifier, i.e. each instance (USIM1, USIM2) performs the monitoring separately. As said earlier, radio link monitoring and timing advance update mechanism may be performed by one of the instances.

In short, in the MAC-based approach of FIG. 6, there is an SRB that carries RRC messages associated with the connection setup. However, from an RRC perspective the connection is a new RRC connection from a new user. In the RRC based approach of FIG. 7, there is an SRB associated with USIM 2 which encapsulates the connection setup messages of USIM1. In other words, there is an RRC message associated with USIM 2, that encapsulates an RRC message associated with the connection establishment of USIM 1. It should be appreciated that in both approaches resources to transmit SRB for USIM1 need to be first requested (messages 6-11, message 7-12 encapsulating message 7-8).

In FIG. 6, the network (radio access network) broadcast its capability to support use of an existing signaling connection for establishing a further signaling connection for another subscription entity and FIG. 7 illustrated an example in which the use is decided when a corresponding request is received (block 7-13). However, further possibilities exist, illustrated in FIG. 8.

Figure 8:
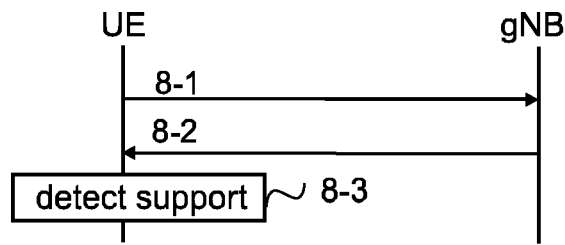

Referring to FIG. 8, at least one of subscription entities in a user device is in the RRC_CONNECTED state, the combination of the subscription entity and the user device being denoted by UE. Before informing other subscription entities in the user device about the existing wireless connection, UE inquires the network about the support by sending message 8-1 to gNB providing the cell. In the illustrated example, it is assumed that the network supports the use of an existing signaling connection for establishing a further signaling connection for another subscription entity, and sends information on the support in message 8-2, and UE detects in block 8-3 the support. It should be appreciated that if message 8-2 contains information that the use of an existing signaling connection for establishing a further signaling connection for another subscription entity is not supported, or if no response to message 8-1 is received, in block 8-3 "no support" is detected.

Messages 8-1 and 8-2 may be a dedicated system information block (SIB) exchange, or a dedicated RRC signaling.

UE may attempt a cell reselection in case the broadcast or a response to an inquiry indicates that that the use of an existing signaling connection for establishing a further signaling connection for another subscription entity is not supported, and/or in case a request for establishing a further signaling connection for another subscription entity is rejected.

Although not illustrated in above Figures, encrypted controlling data exchanged during establishment of the wireless signaling connection, or when the wireless signaling connection is used, is encrypted using key(s) associated with the subscription entity whose data is encrypted (and who is encrypting the data). In other words, no key information is exchanged between the subscription entities and a subscription entity cannot access secure information in another subscription entity.

It should be appreciated that even though in the above examples, especially in FIGS. 6 and 7, subscription entities perform the functionality, part of the functionalities may be performed by the coordinator entity (subscription entity coordinator entity).

The above examples disclose a signaling concept, which enables subscription entity signaling from aiding a signaling connection establishment signaling from another subscription entity signaling. Using the terminology of the new radio, the signaling concept enables USIM signaling from aiding RRC connection establishment from another USIM.

The same signaling concept can be used also when a subscription entity transits from the RRC_INACTIVE state to the RRC_CONNECTED state, when there is in the user device another subscription entity which is in the RRC_CONNECTED state. The "inactive subscription entity" may send an indication, as described in the above examples to the "connected subscription entity", the indication being a resume, resumption or RRC Resume, for example. The "connected subscription entity" then sends to the access node (gNB) an RRC Resume Request (an RRC Resume Request for resuming the other wireless control signaling connection), and receives as a response RRC Resume, for example.

As can be seen, in the disclosed signaling concept there is no need to force the existing active (in the connected state) wireless control signaling connection to be inactive even when there is less transmitters and/or receivers than subscription entities, since the existing signaling connection is used for conveying signaling relating to establishment of another wireless control signaling connection with another subscription entity in the user device. That speeds up transition from the idle state to the connected state, for example to provide a paging response and getting the full paging information. This applies also for user devices comprising at least as many transmitters and receivers as there are subscription entities, since there is no need to perform the full establishment including cell search/selection, initial access and random access.

The blocks, related functions, and information exchanges described above by means of FIGS. 2 to 8 are in no absolute chronological order, and some of them may be performed simultaneously or in an order differing from the given one. Other functions can also be executed between them or within them, and other information may be transmitted. Some of the blocks or part of the blocks or one or more pieces of information can also be left out or replaced by a corresponding block or part of the block or one or more pieces of information.

A first example process comprises: having at least two different subscription entities;
  causing establishing a first wireless signaling connection to a network for a first subscription entity when it transits from an idle state to a connected state;
  sending, by the first subscription entity, at least to a second subscription entity among the at least two different subscription entities in the user device information that the first wireless signaling connection exists;
  sending, by the second subscription entity in an idle state, in response to the information, to the first subscription entity an indication that the second subscription entity wants to establish a wireless signaling connection to transit from an idle state to a connected state;
  causing sending, in response to the first subscription entity receiving from the second subscription entity the indication, using the first wireless signaling connection, a request for establishing a second signaling connection for the second subscription entity;
  receiving, by the first subscription entity, from the network, information required for the second wireless signaling connection;
  passing the information required for the second wireless signaling connection from the first subscription entity to the second subscription entity; and
  causing establishing, using the information required for the second wireless signaling connection, the second wireless signaling connection for the second subscription.

A second example process according to the first example process further comprises using a random access procedure when establishing the first wireless signaling connection.

A third example process according to the first or second example process further comprises:
  causing sending a request for a signaling radio bearer as the request for establishing the second signaling connection for the second subscription entity in a medium access control, MAC, level control element or in a buffer status report to an access node in the cell, the access node providing a first radio link between the access node and the first subscription entity, the first radio link being part of the first wireless signaling connection;
  receiving, as the information required for the second signaling connection, a radio network temporary identifier in a MAC level control element; wherein the causing establishing the second wireless signaling connection for the second subscription comprises:
  monitoring, by the second subscription entity, downlink MAC level control elements to detect a control element comprising the radio network temporary identifier, the control element providing an uplink grant for the second subscription entity in resources of the first wireless signaling connection;
  sending, in response to detecting the control element, a radio resource control, RRC, connection set up request from the second subscription entity using the resources indicated in the uplink grant;
  establishing an RRC connection between the access node and the second subscription entity, the RRC connection being a second radio link that is part of the second wireless signaling connection; and establishing a mobility control, MC, connection between the second subscription entity and a node in a core network of the network, the MC connection being the second wireless signaling connection comprising the second radio link.

A fourth example process according to the first or third example process further comprises:
sending, by the second subscription entity, as the indication, a radio resource control, RRC, connection request;
causing sending, over the first wireless connection, to an access node in a cell, the access node providing a first radio link between the access node and the first subscription entity, the first radio link being part of the first wireless signaling connection, an RRC message requesting an uplink resource for a signaling radio bearer, SRB;
encapsulating, in response to receiving indication of the uplink resource, by the first subscription entity, the RRC connection request within an SRB message;
causing sending in the uplink resource the request for establishing the second signaling connection for the second subscription entity encapsulated in the SRB message to the access node;
receiving, as the information required for the second signaling connection, a radio network temporary identifier; wherein the causing establishing the second wireless signaling connection for the second subscription comprises:
monitoring, by the second subscription entity, downlink control signaling to detect a message comprising the radio network temporary identifier and indicating resources allocated for the second subscription entity in a second radio link that is part of the second wireless signaling connection;
causing sending, in response to detecting the message, an RRC setup completed message to the access node using the resources in the second radio link; and
establishing a mobility control, MC, connection between the second subscription entity and a node in a core network of the network, the MC connection being the second wireless signaling connection comprising the second radio link.

A fifth example process according to any of the first to fourth example process, or any combination of the processes, further comprises, when the first subscription is in the connected state and the second subscription has transit from the connected state to an inactive state:
sending, by the second subscription entity in the inactive state to the first subscription entity as the indication a resumption indication that the second subscription entity wants to resume the second wireless signaling connection to transit from an inactive state to a connected state; and
causing sending, in response to the first subscription entity receiving from the second subscription entity the resumption indication, using the first wireless signaling connection, a resume request as the request for the second signaling connection for the second subscription entity.

A sixth example process according to any of the first to fifth example process further comprises:
determining, whether the network supports a use of the first wireless connection to request establishment of the second wireless connection, based on information received in broadcast from the network; and
performing the sending, by the first subscription entity, the information that the first wireless signaling connection exists, in response to the network supporting the use.

A seventh example process according to any of the first to fourth example process, or any combination of the processes, further comprises:
causing sending to the network an inquiry, whether the network supports a use of the first wireless connection to request establishment of the second wireless connection; and
performing the sending the information that the first wireless signaling connection exists in response to a response to the inquiry indicating that the network supports the use.

An eight example process comprises:
receiving, over a first wireless signaling connection to a first subscription entity in a user device, information indicating a request for establishing a second signaling connection to a second subscription entity in the user device;
generating network information required for the second wireless signaling connection;
sending the network information over the first wireless signaling connection to the first subscription entity;
sending downlink information comprising the network information; and
establishing the second wireless signaling connection with the second subscription entity.

A ninth example process, according to the eight example process further comprises:
receiving the information in a medium access control, MAC, level control element or in a buffer status report;
sending, as the network information, in a MAC level control element, a temporary identifier to the second wireless connection, wherein the establishing comprises:
receiving an RRC connection request from the second subscription entity;
accepting the RRC connection request; and
establishing a second RRC connection as the second wireless signaling connection.

A tenth example process, according to the eight example process further comprises:
receiving the information as an RRC connection request encapsulated within a signaling radio bearer, SRB, message;
sending, as the network information, a temporary identifier to the second wireless connection; and
sending, as the downlink information, an RRC connection setup message comprising the radio network temporary identifier,
wherein the second wireless signaling connection is a second RRC connection.

An eleventh example process, according to the eighth, ninth or tenth eleventh example process further comprises broadcasting information, whether a use of the first wireless connection to request establishment of the second wireless connection is supported.

A twelfth example process, according to the eight, ninth, tenth or eleventh example process further comprises causing sending, in response to receiving an inquiry, whether a use of the first wireless connection to request establishment of the second wireless connection is supported, a response indicating support for the use.

Figure 9:
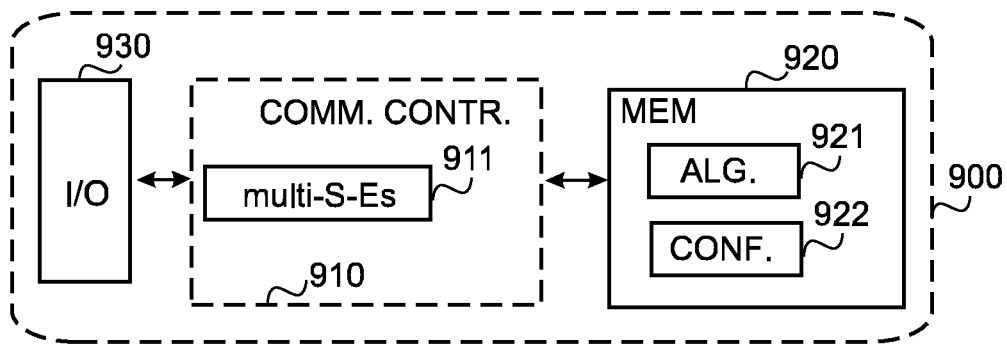
FIGS. 9 and 10 are schematic block diagrams.
Figure 10:
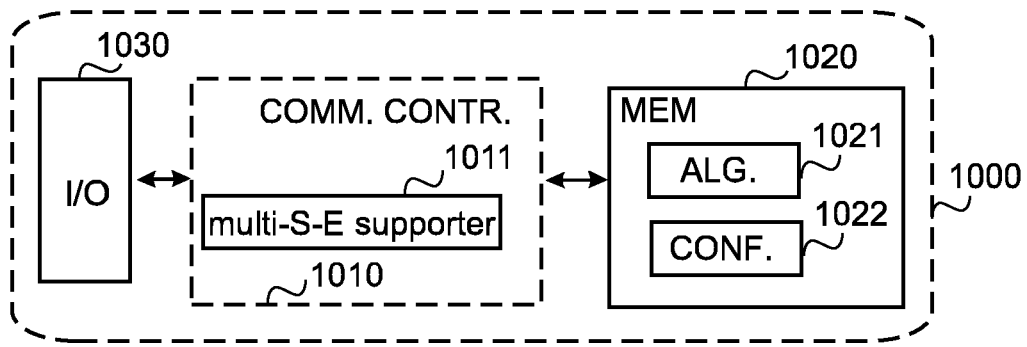

FIGS. 9 and 10 illustrate apparatuses comprising a communication controller 910, 1010 such as at least one processor or processing circuitry, and at least one memory 920, 1020 including a computer program code (software, algorithm) ALG. 921, 1021, wherein the at least one memory and the computer program code (software, algorithm) are configured, with the at least one processor, to cause the respective apparatus to carry out any one of the embodiments, examples and implementations described above. FIG. 9 illustrates an apparatus for the user device, and FIG. 10 illustrates a network apparatus providing one or more cells for user devices, i.e. an apparatus for a base station (access node) of a wireless network. The apparatuses of FIGS. 9 and 10 may be electronic devices.

Referring to FIGS. 9 and 10, the memory 920, 1020 may be implemented using any suitable data storage technology, such as semiconductor based memory devices, flash memory, magnetic memory devices and systems, optical memory devices and systems, fixed memory and removable memory. The memory may comprise a configuration storage CONF. 921, 1021, such as a configuration database, for at least storing one or more configurations, including information on the support for use of an existing signaling connection for establishing a further signaling connection for another subscription entity, and/or temporary identifiers, etc. The memory 920, 1020 may further store, for example, a data buffer for data waiting to be processed (including transmission).

Referring to FIG. 9, the apparatus for the user device comprises a communication interface 930 comprising hardware and/or software for realizing communication connectivity according to one or more radio communication protocols. The communication interface 930 may provide the radio communication capabilities with one or more base stations (access nodes) of a wireless network. The communication interface may comprise standard well-known analog radio components such as an amplifier, filter, frequency-converter and circuitries, conversion circuitries transforming signals between analog and digital domains, and one or more antennas.

The apparatus 900 may further comprise an application processor (not illustrated in FIG. 9) executing one or more computer program applications that generate a need to transmit and/or receive data. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application.

The communication controller 910 comprises one or more processing circuitries 911 configured to support multiple subscription entities (multi-S-Es). The one or more processing circuitries 911 may, for example, configure the user device to perform wireless signaling connection establishments according to any one of the embodiments/examples/implementations described above. The communication controller 910 may control the one or more circuitries 911 to receive control plane messages and to use them to determine and to use reserved resources.

Referring to FIG. 10, the apparatus 1000 may further comprise a communication interface 1030 comprising hardware and/or software for realizing communication connectivity according to one or more radio communication protocols. The communication interface 1030 may provide the apparatus with communication capabilities to user devices (terminal devices) camping in one or more cells provided by the apparatus and/or to the core network. The communication interface may comprise standard well-known analog components such as an amplifier, filter, frequency-converter and circuitries, and conversion circuitries transforming signals between analog and digital domains. Digital signal processing regarding transmission and reception of signals may be performed in a communication controller 1010.

The communication controller 1010 comprises a multi-S-E supporter circuitry 1011 configured to support a use of an existing signaling connection for establishing a further signaling connection for another subscription entity according to any one of the embodiments/examples/implementations described above. The multi-S-E supporter circuitry 1011 may communicate the configurations (configuration information) and allocated resources to user devices through the communication interface 1030.

In an embodiment, at least some of the functionalities of the apparatus of FIG. 10 may be shared between two physically separate devices, forming one operational entity. Therefore, the apparatus may be seen to depict the operational entity comprising one or more physically separate devices for executing at least some of the processes described with respect to gNB (network).

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/soft-ware including digital signal processor(s), software, and memory(ies) that work together to cause an apparatus to perform various functions, and (c) circuits, such as a micro-pro-cessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 8 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments/examples/implementations of FIGS. 2 to 8, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems (apparatuses) described herein may be re-arranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommu-nications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program. A signal may be an electromagnetic signal for encoding information exchanged between a user device (or subscription entity) and the network node, or between subscription entities described in connection with FIGS. 2 to 8.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A user device having at least two different subscription entities, comprising
   at least one processor; and
   at least one memory including computer program code, the at least one memory and computer program code configured to, with the at least one processor, cause the user device at least to:
   establish a first wireless signaling connection to a network for a first subscription entity when transitioning from an idle state to a connected state;
   send to the network an inquiry, whether the network supports a use of the first wireless signaling connection to request establishment of a second wireless signaling connection;
   send, by the first subscription entity in response to a response to the inquiry indicating that the network supports the use, at least to a second subscription entity among the at least two different subscription entities in the user device information that the first wireless signaling connection exists;
   send, by the second subscription entity in an idle state, in response to the information, to the first subscription entity an indication that the second subscription entity wants to establish a wireless signaling connection to transit from an idle state to a connected state;
   send, in response to the first subscription entity receiving from the second subscription entity the indication, using the first wireless signaling connection, a request for establishing a second wireless signaling connection for the second subscription entity;
   receive, by the first subscription entity, from the network, information required for the second wireless signaling connection;
   pass the information required for the second wireless signaling connection from the first subscription entity to the second subscription entity; and
   establish, using the information required for the second wireless signaling connection, the second wireless signaling connection for the second subscription.

2. The user device according to claim 1, wherein the at least one memory and computer program code configured to, with the at least one processor, cause the user device further to use a random access procedure when establishing the first wireless signaling connection.

3. The user device according to claim 1, wherein the at least one memory and computer program code configured to, with the at least one processor, cause the user device further to:
   send a request for a signaling radio bearer as the request for establishing the second wireless signaling connection for the second subscription entity in a medium access control, MAC, level control element or in a buffer status report to an access node in the cell, the access node providing a first radio link between the access node and the first subscription entity, the first radio link being part of the first wireless signaling connection;
   receive, as the information required for the second wireless signaling connection, a radio network temporary identifier in a MAC level control element; wherein the causing establishing the second wireless signaling connection for the second subscription comprises:

monitor, by the second subscription entity, downlink MAC level control elements to detect a control element comprising the radio network temporary identifier, the control element providing an uplink grant for the second subscription entity in resources of the first wireless signaling connection;

send, in response to detecting the control element, a radio resource control, RRC, connection set up request from the second subscription entity using the resources indicated in the uplink grant;

establish an RRC connection between the access node and the second subscription entity, the RRC connection being a second radio link that is part of the second wireless signaling connection; and establish a mobility control, MC, connection between the second subscription entity and a node in a core network of the network, the MC connection being the second wireless signaling connection comprising the second radio link.

4. The user device according to claim 1, wherein the at least one memory and computer program code configured to, with the at least one processor, cause the user device further to:

send, by the second subscription entity, as the indication, a radio resource control, RRC, connection request;

send, over the first wireless signaling connection, to an access node in a cell, the access node providing a first radio link between the access node and the first subscription entity, the first radio link being part of the first wireless signaling connection, an RRC message requesting an uplink resource for a signaling radio bearer, SRB;

encapsulate, in response to receiving indication of the uplink resource, by the first subscription entity, the RRC connection request within an SRB message;

send in the uplink resource the request for establishing the second wireless signaling connection for the second subscription entity encapsulated in the SRB message to the access node;

receive, as the information required for the second wireless signaling connection, a radio network temporary identifier; wherein the causing establishing the second wireless signaling connection for the second subscription comprises:

monitor, by the second subscription entity, downlink control signaling to detect a message comprising the radio network temporary identifier and indicating resources allocated for the second subscription entity in a second radio link that is part of the second wireless signaling connection;

send, in response to detecting the message, an RRC setup completed message to the access node using the resources in the second radio link; and establish a mobility control, MC, connection between the second subscription entity and a node in a core network of the network, the MC connection being the second wireless signaling connection comprising the second radio link.

5. The user device according to claim 1, wherein the at least one memory and computer program code configured to, with the at least one processor, cause the user device further to, when the first subscription is in the connected state and the second subscription has transitioned from the connected state to an inactive state:

send, by the second subscription entity in the inactive state to the first subscription entity as the indication a resumption indication that the second subscription entity wants to resume the second wireless signaling connection to transit from an inactive state to a connected state; and send, in response to the first subscription entity receiving from the second subscription entity the resumption indication, using the first wireless signaling connection, a resume request as the request for the second wireless signaling connection for the second subscription entity.

6. The user device according to claim 1, wherein the at least one memory and computer program code configured to, with the at least one processor, cause the user device further to:

determine, whether the network supports the use of the first wireless signaling connection to request establishment of the second wireless signaling connection, based on information received in broadcast from the network; and send, by the first subscription entity, the information that the first wireless signaling connection exists, in response to the network supporting the use.

7. The user device according to claim 1, wherein the subscription entities are universal subscriber identity modules.

8. An apparatus comprising
at least one processor; and
at least one memory including computer program code, the at least one memory and computer program code configured to, with the at least one processor, cause the apparatus at least to perform:

sending, in response to receiving from a user device an inquiry, whether the apparatus supports a use of a first wireless signaling connection to request establishment of a second wireless signaling connection, a response indicating support for the use;

receiving, over the first wireless signaling connection to a first subscription entity in the user device, information indicating a request for establishing the second wireless signaling connection to a second subscription entity in the user device;

generating network information required for the second wireless signaling connection;

sending the network information over the first wireless signaling connection to the first subscription entity;

sending downlink information comprising the network information; and establishing the second wireless signaling connection with the second subscription entity.

9. The apparatus according to claim 8, wherein the first wireless signaling connection is a radio resource control, RRC, connection and the at least one memory and computer program code configured to, with the at least one processor, cause the apparatus further to perform:

receiving the information in a medium access control, MAC, level control element or in a buffer status report;

sending, as the network information, in a MAC level control element, a temporary identifier to the second wireless signaling connection, wherein the establishing comprises:

receiving an RRC connection request from the second subscription entity;

accepting the RRC connection request; and establishing a second RRC connection as the second wireless signaling connection.

10. The apparatus according to claim 8, wherein the first wireless signaling connection is a radio resource control, RRC, connection and the at least one memory and computer program code configured to, with the at least one processor, cause the apparatus further to perform:
  receiving the information as an RRC connection request encapsulated within a signaling radio bearer, SRB, message;
  sending, as the network information, a temporary identifier to the second wireless signaling connection; and
  sending, as the downlink information, an RRC connection setup message comprising the radio network temporary identifier,
  wherein the second wireless signaling connection is a second RRC connection.

11. The apparatus according to claim 8, wherein the at least one memory and computer program code configured to, with the at least one processor, cause the apparatus further to perform broadcasting information, whether the apparatus supports a use of the first wireless signaling connection to request establishment of the second wireless signaling connection.

12. A method for a user device having at least two different subscription entities, the method comprising:
  establishing a first wireless signaling connection to a network for a first subscription entity when transitioning from an idle state to a connected state;
  sending to the network an inquiry, whether the network supports a use of the first wireless signaling connection to request establishment of a second wireless signaling connection;
  sending, by the first subscription entity in response to a response to the inquiry indicating that the network supports the use, at least to a second subscription entity among the at least two different subscription entities in the user device information that the first wireless signaling connection exists;
  sending, by the second subscription entity in an idle state, in response to the information, to the first subscription entity an indication that the second subscription entity wants to establish a wireless signaling connection to transit from an idle state to a connected state;
  sending, in response to the first subscription entity receiving from the second subscription entity the indication, using the first wireless signaling connection, a request for establishing a second wireless signaling connection for the second subscription entity;
  receiving, by the first subscription entity, from the network, information required for the second wireless signaling connection;
  passing the information required for the second wireless signaling connection from the first subscription entity to the second subscription entity; and
  establishing, using the information required for the second wireless signaling connection, the second wireless signaling connection for the second subscription.

* * * * *